Oct. 21, 1969   V. A. LAUHER   3,474,438
DISPLAY SYSTEM
Filed Sept. 30, 1965   8 Sheets-Sheet 1

INVENTOR
VERLIN A. LAUHER

BY  Sughrue, Rothwell, Mion,
    Zinn & Macpeak
              ATTORNEYS.

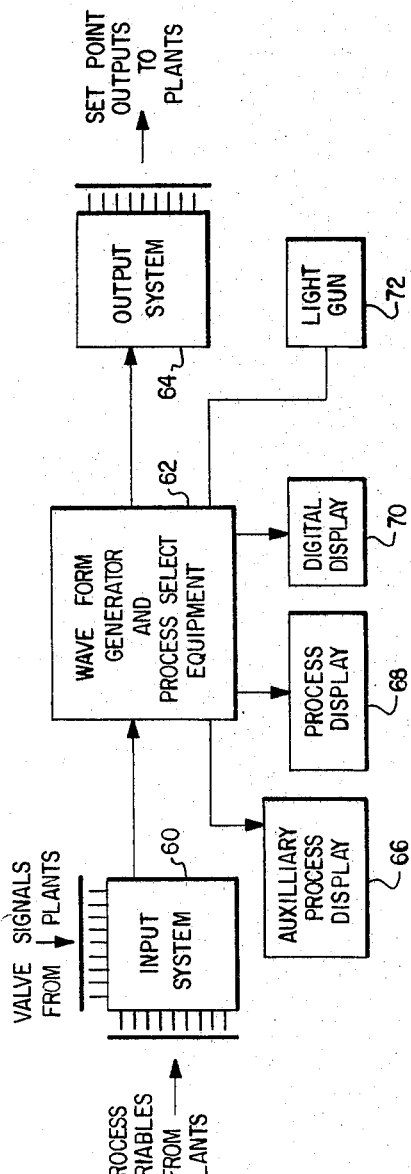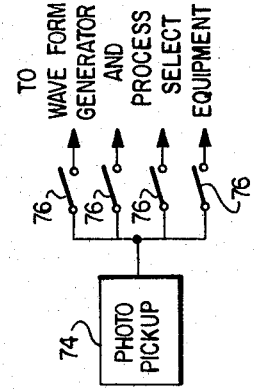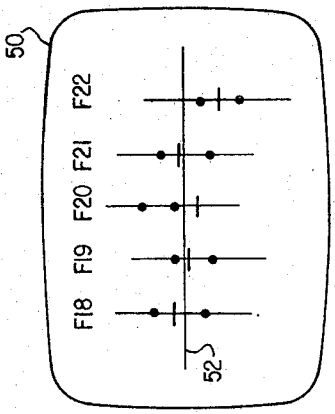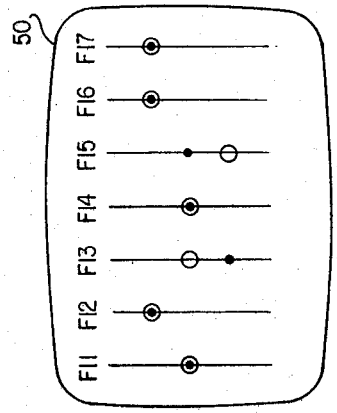

Oct. 21, 1969  V. A. LAUHER  3,474,438
DISPLAY SYSTEM
Filed Sept. 30, 1965  8 Sheets-Sheet 5

INVENTOR
VERLIN A. LAUHER
ATTORNEYS.

FIG. 13
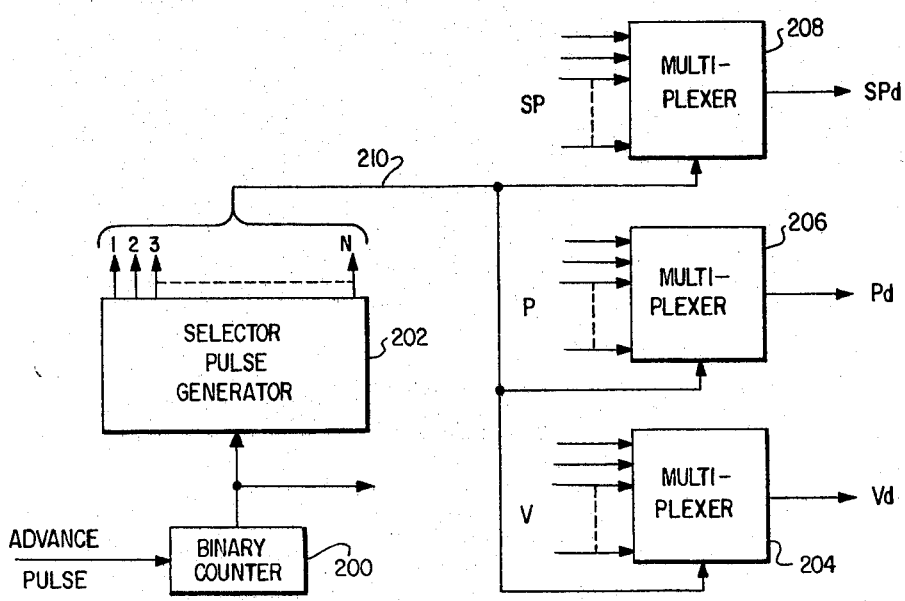
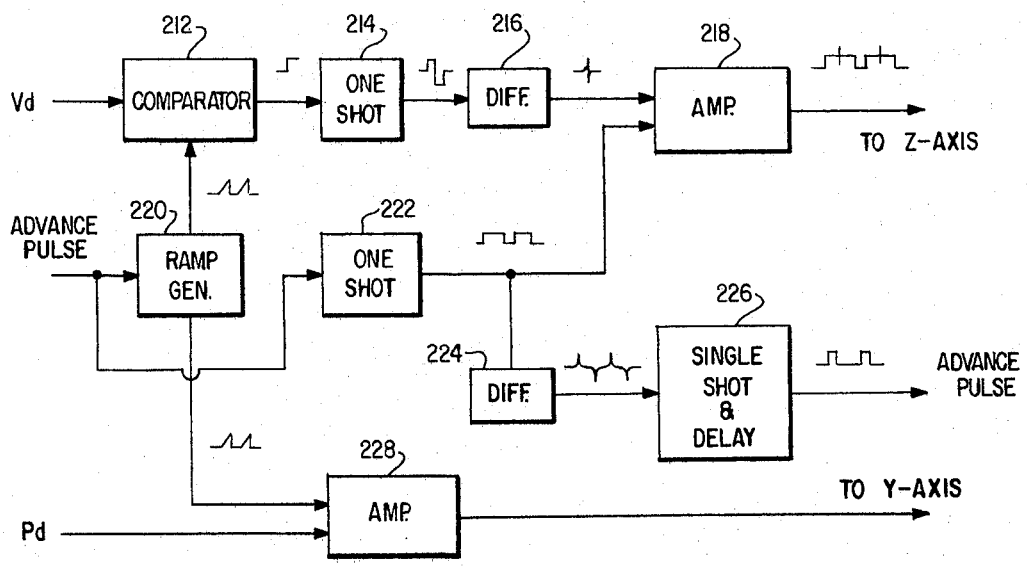
FIG. 14
INVENTOR
VERLIN A. LAUHER
BY
ATTORNEYS.

Oct. 21, 1969　　　V. A. LAUHER　　　3,474,438
DISPLAY SYSTEM

Filed Sept. 30, 1965　　　8 Sheets-Sheet 7

INVENTOR
VERLIN A. LAUHER

BY Sughrue, Rothwell, Mion, Zinn & Macpeak
ATTORNEYS.

Oct. 21, 1969 V. A. LAUHER 3,474,438
DISPLAY SYSTEM
Filed Sept. 30, 1965 8 Sheets-Sheet 8

INVENTOR
VERLIN A. LAUHER

BY *Sughrue, Rothwell, Mion,*
*Zinn & Macpeak*
ATTORNEYS.

United States Patent Office 3,474,438
Patented Oct. 21, 1969

3,474,438
DISPLAY SYSTEM
Verlin A. Lauher, Ballwin, Mo., assignor to Monsanto Company, St. Louis, Mo., a corporation of Delaware
Filed Sept. 30, 1965, Ser. No. 491,789
Int. Cl. G08b 23/00
U.S. Cl. 340—324
33 Claims

ABSTRACT OF THE DISCLOSURE

A central display is provided for a large number of processes. Each separate process is represented by a separate pattern on a display screen; the pattern being generated by electronics which respond to setpoint, process variable, and control element data for any particular process. The position of the pattern on the screen plus the relative position of the certain marks in the pattern provide a visual indication of the setpoint, process variable, and control element data for each process. The setpoint for any of the display processes may be varied by merely pointing a light gun at the pattern representing the process in which the setpoint is to be varied.

---

The invention relates to a control room display system for process control equipment. More particularly, the invention relates to a method and means for consolidating the process control information from an entire operational plant and electronically presenting that information on the face of a cathode ray oscilloscope.

Briefly, a typical process control system is one which electrically varies the input to a mechanical or chemical system, detects the output, called the process variable, and sets the input in accordance with the difference between the measured process variable and the desired process variable, known as the set point. To take a more specific example, the input voltage may control the extent of opening of a valve, the process variable being rate of flow through a pipe which is partially blocked by the valve. The rate of flow is detected and converted to an electrical voltage which is proportional thereto and compared with an electrical voltage which is proportional to the desired rate of flow. Special controller circuits, usually analog control circuits, operate upon the two voltages to produce an output voltage which in turn opens the valve to that particular degree of opening which will cause the desired rate of flow to occur in the pipe.

A typical manufacturing plant may contain a multitude of individual process controllers such as described in the above paragraph, and it is desirable to have all the information from each process controller, e.g., the percent opening of the valve or other variable, the process variable, and the set point, displayed in a single control room. The smaller the space in which such a great amount of information can be presented, the easier it is for the individual who is monitoring the plant processes to quickly see where any errors are occurring and to control the processes in accordance with desired results.

Heretofore the voltages representing information from the local process control equipment have been used to control individual electromechanical devices, each of which displays the information from a single process controller. The space taken up by the numerous electromechanical display devices and the cost of such equipment has created a need for a more compact display presentation which is cheaper in cost, more reliable in operation, and takes up much less space. The present invention solves this need by collecting the process information from a multitude of process control units and presenting all the information in an easy to read and easy to correct manner on the face of a cathode ray oscilloscope, the information being generated electronically by either analog or digital circuitry.

In all such central process control display systems, it is desirable to have means by which the monitor may change the set point of individual processes or directly control the voltage which is applied to the valve or other variable. In the prior art type systems, one of the major equipment failures in the control room is the mechanical movement of the linkages necessary to manipulate set points and variables. In the present invention, no mechanical linkages are necessary, but instead the system makes a unique use of an ordinary light gun. For example, if the monitor desires to vary the set point of a particular process, he points the light gun at the display of that process on the face of the cathode ray oscilloscope and presses one of several buttons. The set point is then automatically changed and this change is seen by a shifting of the visual indications on the display screen which represents that particular process. The opening and closing of a valve may be accomplished in the same manner.

It is therefore an object of the present invention to provide an electronic display for process control information.

It is a further object of the invention to provide a central electronic display and control system for process control units.

An additional object of the present invention is to provide a new and improved system by which an operator may view a plurality of information on an electronic display screen and may control several process control units by pointing a light gun at the display screen.

Another object of the invention is to provide a central electronic multi-colored display of process control information.

Another object of the present invention is to provide an electronic display of the relative values of process control information for a large number of process control units.

The foregoing and other objects, features and advantages of the invention will be apparent from the following more particular description of preferred embodiments of the invention, as illustrated in the accompanying drawings.

In the drawings:

FIGURE 2b is a pattern, helpful in understanding the pattern of 2a;

FIGURE 3 is a general block diagram of a preferred embodiment of the present invention;

FIGURE 4 is a set of waveforms capable of generating the pattern of FIGURE 2a;

FIGURES 5a and 5b are front views of electronic display screens showing alternate patterns in accordance with the present invention;

FIGURE 6 is a block diagram representing the light gun and output switches;

FIGURE 13 is a logic block diagram of an alternate input selection circuitry;

FIGURE 14 is a logic block diagram of an alternate Z axis waveform generator;

The system and method of the present invention are applicable to display in a compact manner information from all types of process control equipment, including those which are totally independent of other processes, those which are dependent upon other processes, those which have local analog controllers, and those which do not have local analog controllers.

Figure 1:
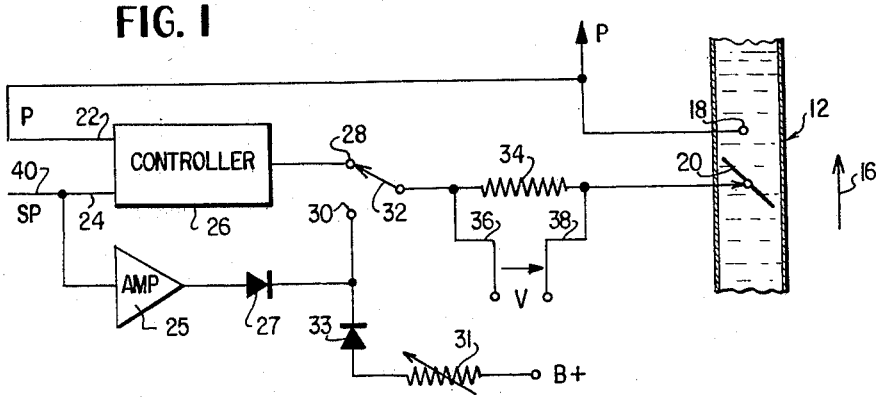
FIGURE 1 is a partial schematic of a process control unit which provides the information displayed by the present invention.

Referring now to FIGURE 1 which shows a typical process control unit whose information may be displayed by the present invention, the letters P, SP and V represent respectively electrical quantities such as voltage or current which are proportional to the process variable, the set point, and the valve position. The particular process variable in FIGURE 1 is the rate of flow of fluid within pipe 12 in a direction indicated by arrow 16. The rate of flow is converted to an electrical quantity by transducer 18, which may be any means for performing the desired function, numerous of which are well known in the prior art. The process variable signal is fed to input 22 of controller 26, the other input 24 being supplied with the set point signal. The two signals are compared by controller 26 whose output contains proportional band, reset, and rate as required by the control loop of the system, and is of the proper value as to maintain valve 20 in such a position that the flow of fluid through pipe 12 will be at the desired level. If the system is operating properly in this manner, P should equal SP. The output from controller 26 is fed directly to valve 20 through impedance 34. Electrical leads 36 and 38 pick off the voltage across impedance 34 and thereby provide an output signal which is proportional to the actual valve position, known as the V signal. If manual operation is desired, a V signal representative of the desired opening position of the valve may be applied at point 40 with switch 32 connected to terminal 30. In the latter position of switch 32, control 26 becomes inoperative to control the valve which is now controlled directly by the input signal rather than by a comparison between the input signal and the process variable.

Variable resistor 31 and diode 33 allow removal of the controller 26 and amplifier 25 when necessary for repair, while at the same time maintaining the V signal at substantially the level derived from the input signals. The amplifier and controller may be removed when switch 32 is in contact with terminal 30. Impedance 31 is varied until the potential from the B+ supply overrides the potential output from amplifier 25. This condition can be detected because a bump occurs in the V signal when override takes place. Controller 26 and amplifier 25 can now be removed.

Figure 2A:
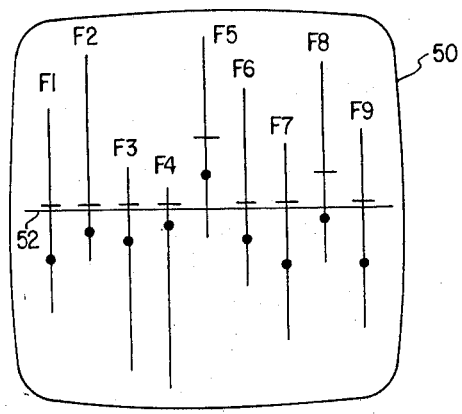
FIGURE 2a is a front view of an electronic display device displaying a pattern in accordance with the present invention.
Figure 2B:
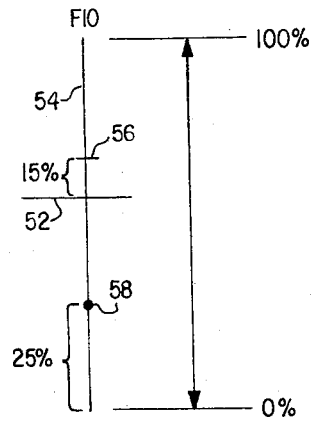

One type of display which may be generated by the present invention is shown in FIGURE 2a wherein each vertical line represents the range of an individual process control unit such as shown in FIGURE 1. For example line F5 may represent the P, V and SP information from the control system of FIGURE 1. The letters F1 through F9 may also be electronically generated on the face of the cathode ray screen 50 by any means well known in the art for generating alphanumeric figures. The purpose of these letters is to indicate to the monitor the process which is represented by an individual line. The interpretation of the information displayed on display screen 50 may be better understood by reference to FIGURE 2b which shows a single vertical line 54 intersecting horizontal line 52. It is noted that a short horizontal mark 56 and an intensified spot 58 also appear on line 54. The vertical line 54 represents the total range of the process variable. The bottom indicates zero percent and the top indicates 100 percent. In other words, if the pipe is capable of carrying liquid at a rate of ten gallons per minute, the 100 percent mark indicates ten gallons per minute. The position of vertical line 54 with respect to horizontal line 52 indicates the set point of the process. In FIGURE 2b horizontal line 52 intersects vertical line 54, fifty percent of the way up from the bottom. That indicates that the set point, SP, otherwise referred to as the desired level, is five gallons per minute, one-half of 100 percent flow. The short horizontal line 56 indicates the process variable P. In FIGURE 2b it is seen that the process variable mark 56 is about fifteen percent above the set point. If the process were operating perfectly, horizontal line 56 would be adjacent to horizontal line 52. Intensified dot 58 represents the V signal. With respect to the process shown in FIGURE 1, the intensified spot 58 indicates that valve 20 is twenty-five percent open. Reading the entire information at a glance, the monitor sees that for process F10, the set point is about fifty percent of total range, and the process variable deviates from the set point about fifteen percent. Also, the valve is open about twenty-five percent of its full open position.

Figure 2C:
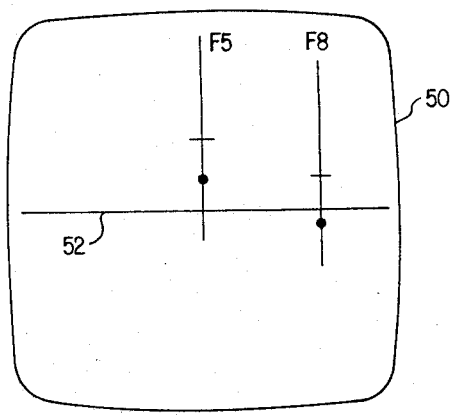
FIGURE 2c is an alternate display in accordance with the present invention.

It can be seen from the display shown in FIGURE 2a that the horizontal line 52 remains stationary and the vertical lines are moved up and down in accordance with the set point signals. The monitor looking at display screen 50 immediately sees that all of the processes are operating correctly except F5 and F8. This is indicated by the fact that the process variable marks for the latter two processes are a substantial distance from the set point crossings. All the marks on the face of the screen may be electronically displayed, but horizontal line 52, since it remains stationary, may be painted across the face of the tube rather than being electronicaly generated. One possible variation of the display is shown in FIGURE 2c wherein all process control information indicating no error is blanked out and only those indications are shown which have a substantial deviation between the process variable and the set point. In such a case, only processes F5 and F8 would be displayed upon the screen 50.

It should be noted that although only nine processes are indicated on the face of oscilloscope 50 in FIGURE 2a, in actual practice hundreds of such indications may be placed on a single cathode ray tube. Also, it should be apparent that there are many various ways of presenting the desired information other than that shown in FIGURE 2a. Two of such other electronic presentations are shown in FIGURES 5a and 5b. In FIGURE 5a, the range lines are maintained at the same height and the set points are indicated by electronically generated circles which intersect the range lines. The process variables are indicated by intensified spots on the range lines, and therefore a no-error process is indicated by the occurrence of the intensified spot within the electronically generated circle. However, if the intensified spot is outside of the circle, as indicated by processes F13 and F15 in FIGURE 5a, there is a deviation between the set point and the process variable, the magnitude of which is indicated by the distance between the circle and the intensified spot.

The display of FIGURE 5b is one in which alarm limits are indicated. For example, each range line contains two intensified spots which represent the range within which the process variable should be. If the process variable is not within that range, serious trouble may be occurring. Process F20 is the only one in which the process variable is outside of the spots which identify the alarm limits. This condition may be made more identifiable to the monitor by intensifying the entire indication of process F20 or by flashing the range line.

A general block diagram of the overall system is shown in FIGURE 3. The system includes an input system 60 to which are applied the signals representing process variables from the several process locations and also the valve signals from the several process locations. It should be noted that although throughout the discussion of the present invention, the V signals are considered to be the valve signals in actual practice the V signal represents whatever type of unit is being controlled. Signals from the input system 60 are applied to a waveform generator and process select equipment 62 whose main function in the invention is to generate proper waveform signals for the X, Y and Z axes of the cathode ray oscilloscopes. Waveform generator and process select equipment 62 also responds to certain signals from light gun 72 to change the SP values or directly control the V signals or display in digital form on digital display 70 the numerical value of a given SP, V or P signal which is being displayed by process display 68. Both process display 68 and auxiliary process display 66 are cathode ray oscilloscopes. Process display 68 represents the type of display which is shown and described in conjunction with FIGURES 2a, 2b and 2c and FIGURES 5a and 5b, whereas auxiliary process display 66 presents a trend display. Normally, in process control rooms, considerable information is recorded on strip charts. These strip charts which normally use ink pens, run at a very slow speed and graph the trend of the variable over the last several hours. Either a conventional strip chart or an electronically generated display of the same information may be used in combination with the present invention. A trend display oscilloscope such as display 66 would be used if the trend is electronically generated.

The waveform generator and process select equipment 62 may include or be associated with a general purpose digital computer or a special purpose digital computer. In such a situation the waveform generator and process select equipment could be controlled by a stored program in the computer memory and furthermore the computer could, at the central location, digitally perform the operation normally performed by the local analog control circuits. That is, the computer would be programmed to digitally compare the SP signal for a particular selected process with the P signal from the selected process and provide a V signal output via output system 64. The V signal output would be the same as that normally provided by the analog circuitry such as controller 26 in FIGURE 1. The controller 26 would of course be disconnected from the local circuitry.

Light gun 72 may be any conventional light gun known in the art. One basic type of light gun having four switches and four outputs is shown in FIGURE 6. The light gun circuity includes a photo-pickup device 74, which is usually placed on the face of a cathode ray tube, and switches or buttons 76 which are placed on the gun. When the stream of electrons in the cathode ray tube illuminates the spot over which photo-pickup 72 is placed, an electrical pulse output is passed through the closed switch to energize a particular circuit, to be described later, in the waveform generator and process select equipment 62.

As mentioned above, the waveforms which are supplied to the cathode ray tube for the purpose of displaying the desired information may be generated either by analog waveform generating circuitry or by digital circuitry. However, before discussing particular circuitry in some detail, the waveforms themselves will be discussed.

Figure 4:
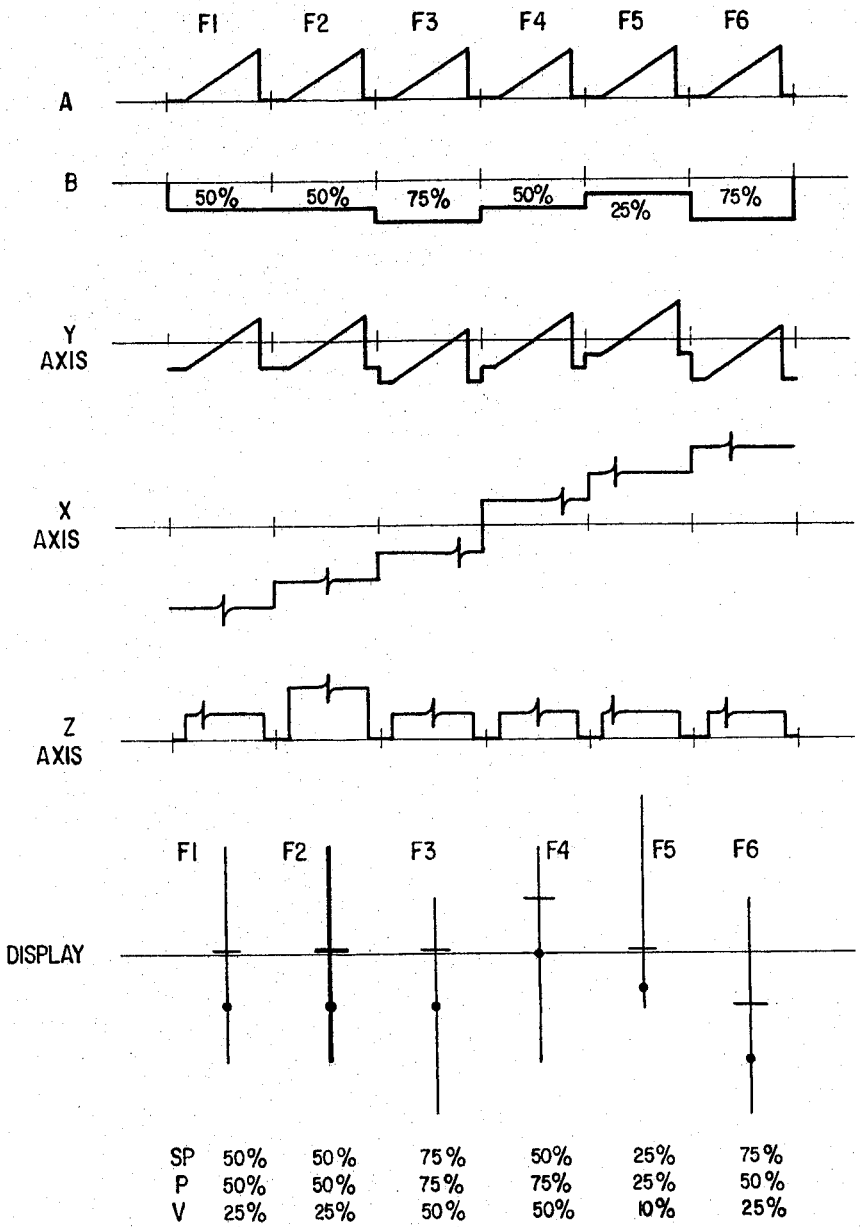

FIGURE 4 shows a plurality of timing diagrams and also the display of processes F1 through F6, which would result therefrom. The indicated values of processes F1 through F6 are printed directly below the range lines and it is seen for example that in F1 the valve is twenty-five percent opened, and the process variable and set point are both at fifty percent of full range. The indication of F1 is displayed on the tube in the following manner. A periodic sawtooth generator generates the waveform shown in line A. These sawtooth waves if applied directly to the Y axis of the oscilloscope would cause the spot on the face of the tube to sweep in a vertical manner. Since the position of the range line on the tube varies with the set point signal, it is necessary to change the D.C. level of the individual sawtooth waves in accordance with the set point signals. Line B of FIGURE 4 represents the D.C. signal which is combined with the sawtooth wave to form the signal shown in line Y. For process F1, the set point is fifty percent and is represented by the negative fifty percent D.C. signal. When the fifty percent D.C. signal is added to the sawtooth wave, it is seen that the sawtooth wave crosses the zero axis at exactly one-half the way up its excursion. Note that, for F3, wherein the set point is seventy-five percent of full range, the D.C. signal on line B is a greater negative signal causing the corresponding sawtooth waveform to intersect the zero axis after traveling seventy-five percent of its excursion as shown in line Y of FIGURE 4. The signal which appears on line Y of FIGURE 4 is applied to the Y or vertical axis of the cathode ray oscilloscope.

Since processes F1 through F6, when displayed, are to be displaced horizontally from one another, it is necessary to apply a stepwave such as that shown in line X of FIGURE 4 to the X or horizontal axis of the cathode ray tube. The latter stepwave shifts the spot one position horizontally after each vertical excursion is completed. It can be seen in FIGURE 4 that pulses are superimposed upon the X axis waveform. The latter pulses cause a brief sweep of the spot back and forth horizontally, thereby creating the short horizontal line which represents the process variable. As will be explained hereafter, the vertical sweep may be momentarily stopped while the process variable is generated. The position of the pulse on each step is controlled by the input voltage signal representing the P values of the individual processes. For example, the P value of F1 is the voltage equivalent of fifty percent of full range, and therefore the pulse on the first step of the X axis wave is halfway between the beginning and end of the step. In F3, the P value is the voltage equivalent of seventy-five percent of full range, and therefore the pulse appears at a distance of seventy five percent from the beginning of the step to the end of the step.

The other waveform which must be generated is that which is applied to the Z or intensity axis. It can be seen from FIGURE 4 that the signal applied to the Z axis is a plurality of square waves each beginning at the start of a sawtooth wave in line A and terminated at the end of a sawtooth wave in line A. These pulses serve the purpose of illuminating the screen during the vertical excursion of the cathode ray tube beam caused by the sawtooth signals on the Y axis. If it is desired to cause one of the processes, for example process F2, to stand out, the amplitude of the pulse on the Z axis could be increased as shown in FIGURE 4. Superimposed upon the Z axis square waveforms are small pulses which further intensify the display causing the appearance of a spot thereon. The position of the latter small pulses with respect to the beginning and end of each square waveform is controlled by the V signal of the individual process. For example, in process F1, the V signal is the voltage equivalent of twenty-five percent of full range, and therefore the small pulse appears at a distance of twenty-five percent from the front end of the square wave. As will be explained hereafter, the vertical sweep may be momentarily stopped while the intensified spot is being generated.

A detailed description of digital circuitry capable of generating the necessary waveforms to display the desired information will now be explained in conjunction with FIGURES 7 through 12.

Figure 7:
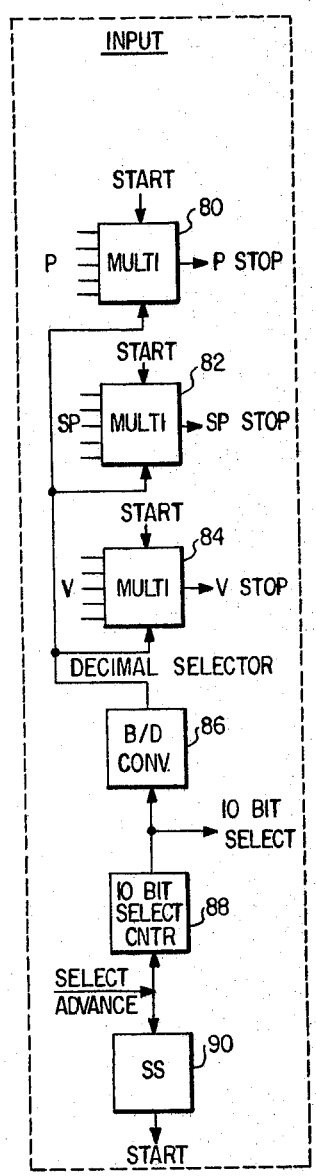
FIGURE 7 is a logic block diagram of digital input circuit.

The input circuit shown in FIGURE 7 includes primarily three identical multiplexers 80, 82 and 84. Multiplexer 80 receives the P signals, multiplexer 84 receives the V signals, and multiplexer 82 receives the SP signals. The P and V signals are supplied to the input circuit via connections to the local process control equipment whereas the SP signals are internally generated and stored as will be explained hereafter. Each multiplexer circuit is capable of selecting one input lead and converting the voltage on that input lead to a time duration signal. For example, multiplexer 80 may first select the P signal on the upper lead and produce an output pulse whose duration is dependent upon the voltage appearing on the first lead. The result is a duration signal which is proportional to the P signal. Circuits capable of performing this function are well known in the art. The variable inputs and the control inputs to the multiplexers are arranged so that all multiplexers select variable signals from the same process at the same time.

The input circuit operates in the following manner: assume a select advance pulse appears at the select advance lead. The latter pulse advances ten-bit select counter 88 one position. It may be assumed that there are 100 processes to be displayed, F1–F100. Under such condition counter 88 would count from 0 to 99 and recycle. At count 0 the multiplexers select process F1, at count 1 they select F2, and so on. The output of the ten-bit select counter 88 is connected to binary-to-digital converter 86 which converts the output from counter 88 into a multi-line decimal selection. The multi-line outputs from converter 86, shown in the drawing as a single line, are applied to multiplexers 80 through 84 for causing the multiplexers to select the P, V, and SP signals from the proper process. For example, each time a select advance pulse appears, the ten-bit select counter advances one position and the binary-to-digital converter selects a different line which in turn controls the three multiplexers. The three multiplexers in response thereto select individual input leads to be converted into time duration pulses. It should be noted that when a particular input to multiplexer 80 is selected, the inputs to multiplexers 82 and 84 are from the same process. That is, for a given count in ten-bit select counter 88 (e.g., count 27) multiplexers 80, 82 and 84 will select the information from process F26. When the next select advance pulse is received thereby advancing ten-bit select counter 88 one position, multiplexers 80, 82 and 84 will select the information from process F27, and so on. The select advance signal is also applied to a single shot 90 which in turn provides an output start pulse which is slightly delayed in time from the select advance signal. The output start pulse is applied to all of the multiplexers and thereby controls the start time of the time duration pulses. The end of the time duration pulses is controlled by the variable signal on the lead selected.

Figure 8:
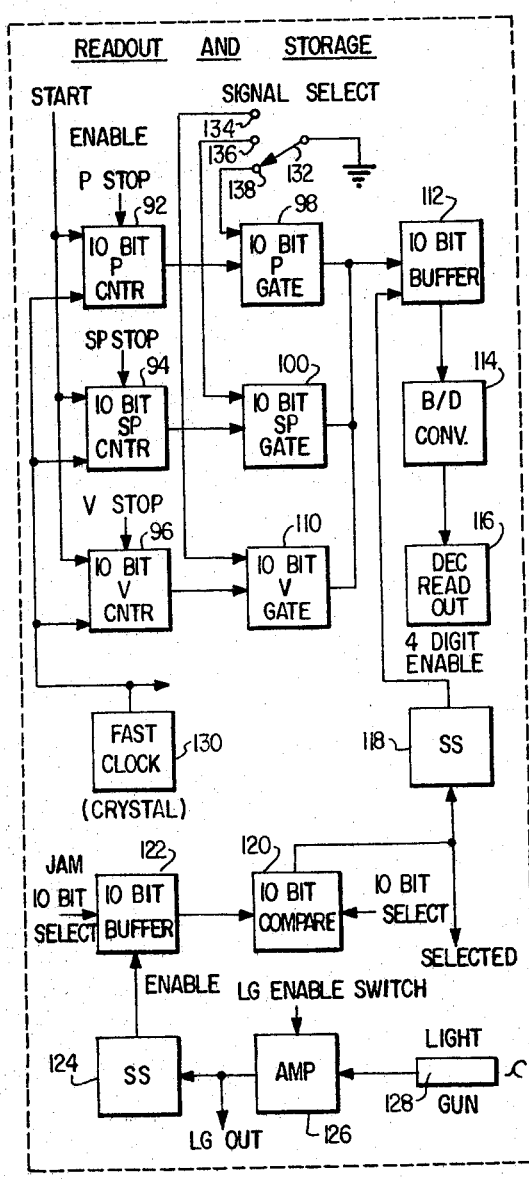
FIGURE 8 is a logic block diagram of the digital selection, readout and storage circuitry.
Figure 9:
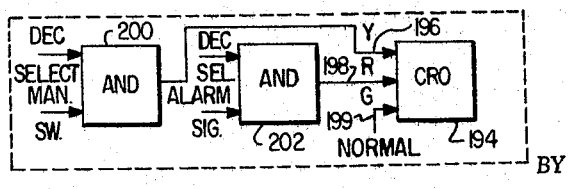
FIGURE 9 is a logic block diagram of a multiple color code circuit.

The readout and storage device shown in FIGURE 8 is capable of storing and displaying on a digital display (display 70 in FIGURE 3) any selected P, V, or SP signal. The P, V and SP time duration pulses from the input circuit are converted to digital values by ten-bit counters 92, 96 and 94. For example, when the start pulse from single shot 90 appears, each of the ten-bit counters beings counting at a rate determined by the frequency of fast clock 130. When the P stop signal arrives from multiplexer 80, ten-bit P counter 92 stops counting and contains the digital equivalent of the selected P signal. In the same manner, the ten-bit V and SP counters 96 and 94 contain the digital equivalents of the selected V and SP inputs. The outputs from the ten-bit counters 92, 94 and 96 are applied respectively to the ten-bit gates 98, 100 and 110. Only one of the latter three ten-bit gates is energized to pass the counter outputs therethrough to a ten-bit buffer 112. For example, FIGURE 8 shows switch 132 connected to terminal 138. This connection enables ten-bit P gate 98 to pass the digital output from ten-bit P counter 92 to the ten-bit buffer 112. If it is desired to readout the V signals, switch 132 is connected to terminal 134.

The digital information which passes through one of the ten-bit gates is stored in ten-bit buffer 112 only if a pulse is applied to ten-bit buffer 112 from the single shot 118. If no pulse is applied from single shot 118, the information passing through the ten-bit gate will not be stored in the buffer 112. The digital information which is stored in the buffer 112 is converted from binary to decimal form in converter 114 and applied to a decimal digital readout means 116. Decimal digital readout means 116 corresponds to the digital display 70 in FIGURE 3. The latter may be any conventional device capable of displaying a decimal digital signal, many of which are well known in the art.

The particular signal which is selected is determined by light gun 128 which corresponds to light gun 72 of FIGURE 3. For the purpose of explanation, assume that it is desirable to have a digital indication of the P signal from process F25. Since it is a P signal which is desired, switch 132 is connected to terminal 138 thereby enabling ten-bit P gate 98. Next, the face of light gun 128 is placed on the face of the cathode ray tube which displays the information at any point on the F26 range line. The range line F26 will be generated by the cathode ray tube at the time that ten-bit select counter 88 contains the particular count which causes multiplexers 80, 82 and 84 to select the F26 variables. It should be noted that although the CRO electron beam generates a particular range line at specific times determined by the controlling waveforms, as shown in FIGURE 4, the monitor sees a continuous picture due to the persistence of the chemical, usually phosphorus, on the internal face of the screen. Thus, with light gun 128 positioned as explained and with the light gun enable switch depressed, the cathode ray tube electron beam will sweep across the front end of the light gun thereby causing a pulse output therefrom at a time when ten-bit select counter 88 contains the aforementioned particular count. The pulse from light gun 128 passes through amplifier 126 and energizes single shot 124 which in turn produces a pulse that enables ten-bit buffer 122. When the enable signal is applied to ten-bit buffer 122, the output count from ten-bit select counter 88 is jammed into the ten-bit buffer and stored therein. In our example the count is twenty-seven. The ten-bit buffer 122 is connected as one input to ten-bit compare circuit 120, the other input being taken directly from the output of ten-bit select counter 88. Since ten-bit buffer 122 contains the count corresponding to process F26, the ten-bit compare circuit will produce an output every time ten-bit select counter 88 accumulates a count of twenty-seven, which is equivalent to the F26 process. The pulse output from ten-bit compare circuit 120 energizes a single shot 118 which in turn allows the P signal from F26, which is presently being counted in ten-bit P counter 92, to pass through ten-bit P gate 98 and be stored in ten-bit buffer 112. Thus, the P signal from process F26 is stored in ten-bit buffer 112 and is displayed digitally by the decimal readout device 116.

If the P signal from F26 changes, the change will be indicated by the decimal readout device without the need for again depressing the switch on the light gun. The change is indicated automatically due to the fact that the count of twenty-seven corresponding to F26 is stored in ten-bit buffer 122. Therefore, every time that the ten-bit select counter reaches twenty-seven, the ten-bit compare circuit energizes single shot 118 which in turn allows the new P signal from F26 to be stored in the ten-bit buffer.

It should be noted that the enable switch connected to amplifier 126 is only one of the switches on light gun 128. The other switches and their functions will be explained below.

Figure 10:
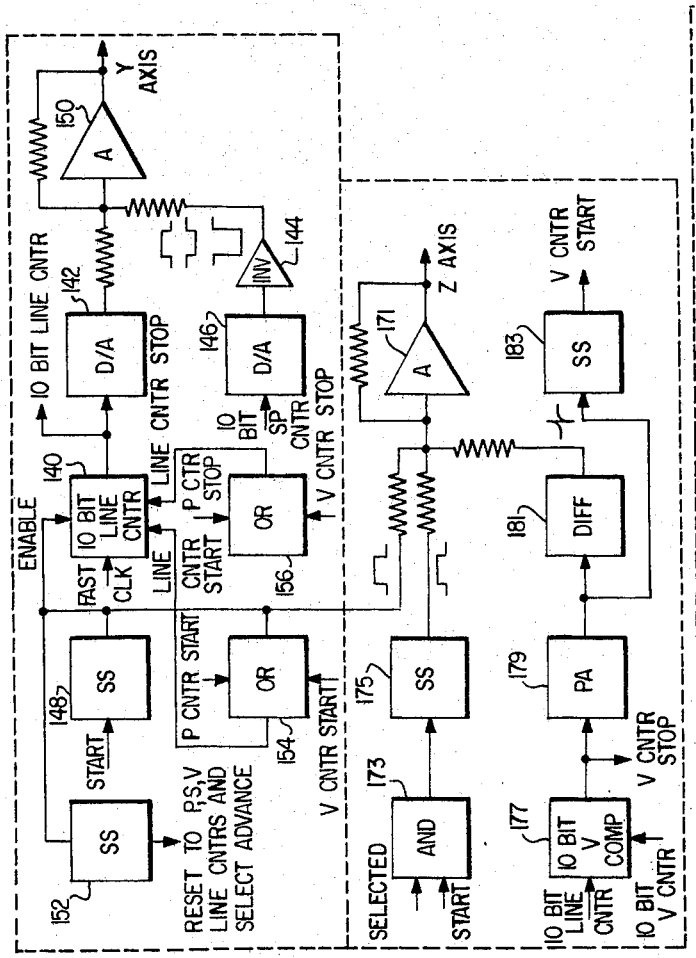
FIGURE 10 is a logic block diagram of the Y and Z axis waveform generators.

The circuit for generating the signal applied to the Y axis of the cathode ray tube display is shown in FIGURE 10. A start pulse from single shot 90 of FIGURE 7 is applied to single shot 148. The output from single shot 148 is a pulse of a given duration and is applied to the ten-bit line counter 140 to enable the ten-bit line counter 140 to operate. The output of single shot 148 is also applied through OR gate 154 to the line counter start input of ten-bit line counter 140. When a signal is received at the line counter start input of counter 140 and the counter is enabled, the counter begins accumulating at a rate determined by the frequency of fast clock 130, shown in FIGURE 8. The output from ten-bit line counter 140 is applied to a digital-to-analog converter 142 whose output is substantially a sawtooth waveform as shown in line A of FIGURE 4. The substantially sawtooth waveform is added to a D.C. level signal which raises or lowers the sawtooth wave thereby indicating the proper set point on the cathode ray tube. The signals are added at the input to amplifier 150 and applied to the Y axis or vertical plates of the cathode ray tube. The D.C. level signal is generated by applying the output from ten-bit SP counter 94 to digital-to-analog converter 146. Since the ten-bit SP counter 94 contains the digital equivalent of the selected SP signal, the output from the digital-to-analog converter 146 will be a voltage which is proportional to the selected SP signal. The analog output from digital-to-analog converter 146 is applied to the input of amplifier 150 through inverter 144 in order to generate the D.C. signal similar to that shown in line B of FIGURE 4. The addition of these two signals results in a waveform substantially similar to that shown in line Y of FIGURE 4. OR gate 156 has a P counter stop input and a V counter stop input and has an output which is connected to the line counter stop input to the ten-bit line counter 140. It is the function of the latter two inputs to stop the counter 140 when either a P mark or a V mark is being generated on the screen. When a pulse appears on either the P counter stop input or the V counter stop input, the ten-bit line counter stops counting and does not begin counting again until a P counter start signal or a V counter start signal is applied through OR gate 154 to the line counter start input of counter 140. A clearer indication is obtained on the face of the display by stopping the ten-bit line counter and therefore stopping the vertical excursion during the latter mentioned periods.

The output pulse from single shot 148 is also applied to single shot 152 which, after a delay sufficient to allow generation of a single vertical line on the cathode ray tube, provides an output pulse which resets the line counters and provides the select advance pulse indicated in FIGURE 7. At the time the select advance signal is generated, one particular cycle of operation of the device has been completed. That is, one of the multi-input information signals has been presented throughout its entire time cycle.

Figure 11:
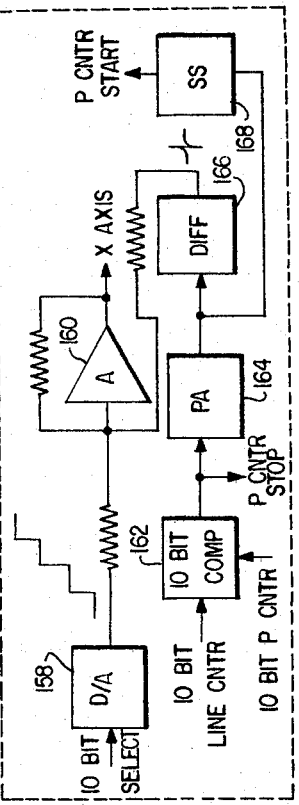
FIGURE 11 is a logic block diagram of an X axis waveform generator.

FIGURE 11 shows the circuitry for generating the X axis signal. The output from ten-bit select counter 88, shown in FIGURE 7, is applied as an input to the digital-to-analog converter 158, resulting in a stepwave output from the digital-to-analog converter. Since the ten-bit select counter advances one count for each separate process, the stepwave functions, when applied to the X axis, to separate the vertical range lines by discrete amounts. The short horizontal process variable lines are generated by comparing the output from ten-bit line counter 140 (shown in FIGURE 10) with the output from ten-bit P counter 92 (shown in FIGURE 8) in a ten-bit comparator 162. The ten-bit P counter 92 contains the digital equivalent of the selected P signal and therefore the ten-bit P comparator produces an output pulse when the ten-bit line counter 140 reaches a value equal to the digital representation of the selected P signal. When the latter condition occurs, a P counter stop pulse is applied through OR gate 156 to momentarily stop ten-bit line counter 140. At the same time, the output from comparator 162 is passed through a pulse amplifier 164 into a differentiator 166. The output from differentiator 166 is superimposed upon the stepwave at a position with respect to the beginning of an individual step which is proportional to the selected process variable voltage. The stepwave with the superimposed differentiated signals, as shown in line X of FIGURE 4, is passed to the X axis or horizontal plates of the cathode ray tube through amplifier 160. At the same time the signal from pulse amplifier 164 is applied to differentiator 166, single shot 168 is energized and provides a slightly delayed P counter start pulse. The P counter start pulse is applied through OR gate 154 to the line counter start input of the ten-bit line counter 140. The purpose of the latter pulse is to allow the ten-bit line counter 140 to start counting again at the point where it left off.

The Z axis intensification pulse is generated by single shot 148 in FIGURE 10, whose output is a pulse of duration equal to the time necessary for ten-bit line counter 140 to count from zero to maximum including the two delays caused by the P counter stop pulse and the V counter stop pulse. The pulse output from 148 is applied through amplifier 171 to the Z axis to intensify the electron beam for visual indication on the face of the cathode ray tube. If it is desired to increase the intensity of an individual range line, the light gun may again be used by pressing it against the desired range line and depressing the switch which connects the light gun output to AND gate 173. The output from AND gate 173 is applied to a single shot 175 which generates an additional pulse to be added to the original intensification pulse for the purpose of greatly illuminating a particular line.

The intensified spot on each range line which indicates the V signal for a process is generated in the same manner as the short horizontal line explained above. The output from the ten-bit line counter 140 is compared with the output of the ten-bit V counter 96 in a ten-bit V comparator 177. The output therefrom is applied through a pulse amplifier 179 to a differentiator 181 whose output is added to the intensification pulses at the input to amplifier 171. The ten-bit line counter 140 is stopped by the V counter stop pulse and is started again by the V counter start pulse, the latter being generated by single shot 183, in order to allow the intensification spot to be put on the display without any smearing.

Figure 12:
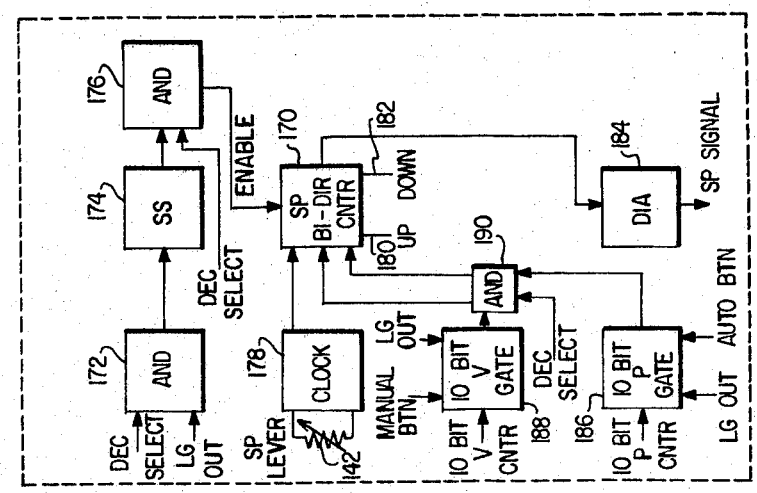
FIGURE 12 is a digital logic block diagram of a set point memory and automatic/manual selection control circuitry.

The circuit shown in FIGURE 12 is adapted to store and vary the set points, and also when the system is operating in manual mode to directly control the V signal applied to the valves. AND gates 172, 176 and 190, single shot 174, set point bidirectional counter 170 and digital-to-analog converter 184 are duplicated in the system as many times as there are individual processes which are controlled. In other words, a separate group of the above-listed circuitry exists for each individual process. Clock 178, ten-bit V gate 188 and ten-bit P gate 186 may serve all of the individual units. In operation, the set point of a particular process, e.g., process F26, is stored in the SP bidirectional counter 170. The output of bidirectional counter 170 is converted to an analog value by the digital-to-analog converter 184 whose output is in turn applied to lead 40 as shown in FIGURE 1. The output from digital-to-analog converter 184 is also applied as the F26 input to multiplexer 82 shown in FIGURE 7.

Assume now, that the analog control system of FIGURE 1 is process F26 and is operating in the automatic mode, i.e., switch 32 is connected to terminal 28, and it is desired to change the set point. The light gun is placed against the F26 range line on the face of the cathode ray tube and the "automatic" button is pressed. The light gun output is connected via the switch depressed by the "automatic" button to AND gate 172 which also has an input from the decimal selector. It will be remembered from the above description of FIGURE 7 that the decimal selector, which is the output of binary-to-digital converter 86, is a plurality of leads, each being unique to a single process and thereby causing the multiplexers 80, 82 and 84 to select that particular process with which it is associated. Since there is a separate AND gate 172 associated with each process, each one receives a different input lead from the decimal selector and is energized when the proper decimal select signal is in coincidence with the light gun output. Such coincidence occurs when the cathode ray beam sweeps across the muzzle of the light gun, thereby energizing the photocell. The output from AND gate 172 is applied to a single shot 174 which in turn applies a gating pulse through AND gate 176 to enable the F26 set point bidirectional counter 170. When enabled, the bidirectional counter is capable of counting up or down at a speed determined by the frequency of clock 178. If it is desired to lower the set point of process F26, down button 182 is depressed and the set point lever 192 is set at a level to cause counting at a desired frequency. In the physical embodiment of the system, a single lever appears on a control panel and is connected to the up and down buttons 180 and 182 and also to the variable impedance 192. When the physical lever is pushed up, the bidirectional counter counts in an upward direction at a speed dependent upon the distance of the physical lever from the center, and the reverse situation occurs when the physical lever is pushed down. As set point bidirectional counter 170 counts up, the set point signal output from the digital-to-analog converter 184 also increases thereby moving up the set point on lead 40 of FIGURE 1 and also, since the SP signal is supplied as an input through multiplexer 82, moving up the set point indication on the face of the tube.

If it is desired to control the valve of process F26 directly, the light gun is again placed on the range line of process F26 and the "manual" button is depressed. The manual button causes an automatic switching of switch 32 in FIGURE 1 to change from terminal 28 to terminal 30. In this condition, the signal to lead 40 is applied directly through amplifier 25, diode 27 and resistance 34 to the valve 20. The particular set point bidirectional counter 170 which is associated with process F26 is selected or rather enabled by the same means as described above, that is, the AND gates 172 and 176 and single shot 174 with their respective inputs. However, in the manual mode, it is necessary to jam the V signal of process F26 into the set point bidirectional counter and start counting from that value. The jamming takes place via ten-bit V gate 188, AND gate 190 and the input therefrom to the bidirectional counter 170. When the light gun is pressed against the range line of F26 and the manual button is depressed, the coincidence of the two signals opens the ten-bit V gate 188 which passes the output from ten-bit V counter 96, shown in FIGURE 8, to AND gate 190. At the time of coincidence of the manual button input and the light gun output, the ten-bit V counter 96 contains the digital equivalent of the V signal for process F26. The particular AND gate 190 associated with F26 is enabled by the decimal select signal for F26 and jams the digital equivalent of the V signal into the set point bidirectional counter 170. The bidirectional counter then counts up or down in the same manner as described above, causing the output from the digital-to-analog converter 184 to also move up or down. The difference is that the output from digital-to-analog converter 184, although still applied as a voltage signal to lead 40 in FIGURE 1, is now a V signal rather than an SP signal.

It should be noted that when switch 32 is released from terminal 28 and moved to terminal 30, the V signal is present on lead 40 and since the same V signal at that instant is present at the output of controller, bumpless switching occurs.

When the system is switched back to automatic, and the light gun is placed against the range line of F26, the output of ten-bit P counter 92, shown in FIGURE 8, is jammed through ten-bit P gate 186 and AND gate 190 into the set point bidirectional counter 170 thereby creating a new set point which is equal to the P signal. This set point may again be changed up or down in the manner described previously. Since the set point signal and the process variable signal are equal when switch 32 of FIGURE 1 is switched back to the automatic mode, bumpless switching takes place because zero error is in the controller and the valve will not move.

If a color tube is used, it is possible to display different range lines in different colors depending upon whether or not they are on manual or automatic or the difference between the P signal and the SP signal of a particular process is greater than the alarm limit. One possible color code is indicated by the simple circuitry of FIGURE 9 which shows the cathode ray oscilloscope 194 having different inputs connected to its yellow, red and green color guns 196, 198 and 199, respectively. During normal conditions, all range lines are colored green. If a particular process is put on manual control, the coincidence of the proper decimal select input and the output from the manual switch energizes AND gate 200 which in turn causes the range line representing the particular process to be colored yellow. If a process variable is outside of the alarm limit, the range line associated with that variable will be colored red as indicated by AND gate 202 and the inputs thereto. It should be apparent to those skilled in the art that many variations on the above color scheme are possible.

The color display system, in addition to being capable of calling attention to certain abnormal operating processes, takes on particular significance as the display tube becomes more and more densely populated with range lines, indicia, etc. The resolution and compactness of the system may be significantly enhanced with the color tube display.

One particular embodiment of an analog waveform generator which may be used in practicing the present invention is shown in FIGURES 13 through 18. Referring to FIGURE 13, the three multiplexers are designated by the numerals 204, 206, and 208. D.C. multiplexers are used and they are operable to switch the process variable, set point and valve inputs into three channels of output. The outputs are D.C. levels and are not converted to a digital-type signal. The outputs from multiplexers 208, 206, and 204, are $SP_d$, $P_d$ and $V_d$, respectively, the subletter indicating that the output is a D.C. level voltage which is equal to or proportional to the selected input variable. The multiplexers select the desired variables in accordance with energizing signals on the output leads from a selector pulse generator 202. The selector pulse generator may be any means, many of which are well known in the art, which is capable of providing a sequence of outputs on a plurality of output leads in response to an input pulse. The output leads of selector pulse generator 202 are indicated by leads $l$ through $n$, where $n$ is the number of processes to be displayed. It is indicated in the drawing that the leads are connected to the multiplexers through cable or similar connection means 210. A binary counter 200 receives advance pulses indicating the termination of a display of an individual process. The binary counter accumulates the advance pulses and causes the selector pulse generator 202 to sequentially provide energization signals on its output leads.

The Z axis and Y axis waveforms are generated by the block diagram shown in FIGURE 14. The advance pulses are applied to a ramp generator 220 which in turn supplies sawtooth wave signals to comparator 212 and amplifier 228. Comparator 212 compares the increasing sawtooth signal with the $V_d$ output from multiplexer 204. Since $V_d$ is a D.C. level voltage proportional to the selected valve variable, the output from comparator 212 will be a time coincidence signal which occurs at a time relative to the start of the sawtooth wave which is proportional to the selected V variable. The comparator output is applied to a one shot 214 which is in turn differentiated in a differentiator 216 and applied to an amplifier 218. The differentiated pulses from differentiator 216 are summed in summing amplifier 218 with the unblanking pulses generated by single shot 222 in response to the advance pulses. The output from summing amplifier 218 is applied to the Z axis of the display oscilloscope.

The ramp generator output is also added to the $SP_d$ signal from multiplexer 208 in summing amplifier 228. The resulting output therefrom is a sawtooth waveform which is superimposed upon a D.C. level signal proportional by the selected process variables, and is applied to the Y axis of the oscilloscope.

The advance pulses may be generated by a number of circuits, one of which is indicated in FIGURE 14 by differentiator 224 and single shot and delay 226. The unblanking pulses from single shot 222 are differentiated by differentiator 224. Single shot and delay 226 provides a slightly delayed output pulse in response to the negative input spikes.

Figure 15:
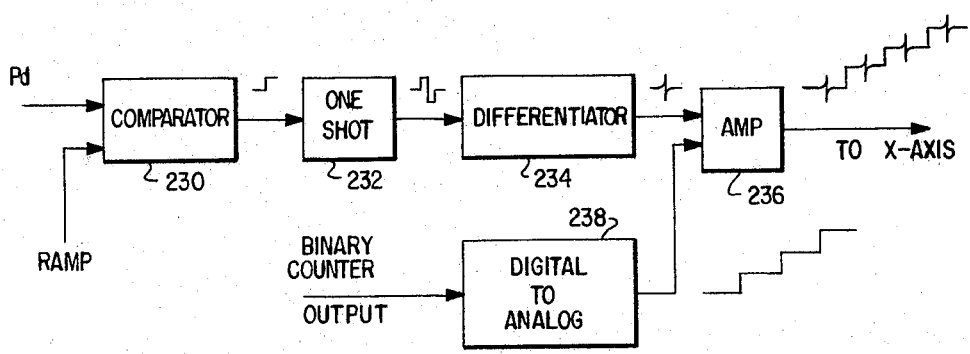
FIGURE 15 is a logic block diagram of an alternate X axis waveform generator.

The circuit for generating the X axis waveform is shown by the block diagram in FIGURE 15. The ramp signal from ramp generator 220 and the $P_d$ voltage from multiplexer 206 are compared in comparator 230. Comparator 230, one shot 232, differentiator 234 and amplifier 236 operate in the identical manner as that described for comparator 212, one shot 214, differentiator 216 and amplifier 218 of FIGURE 14. The result is that a pulse, whose time of occurrence with respect to the start of each ramp waveform is proportional to the voltage level of the selected process variable, is added to a step waveform and applied to the X axis of the oscilloscope. The step waveform may be generated by applying the output from binary counter 200 (FIGURE 13) as an input to a digital-to-analog converter 238.

The set point voltages for the system may be stored in memory amplifiers, one for each process. One example of equipment to change the set point level is shown by the block diagram in FIGURE 16 wherein the light gun signal from light gun 240 is fed to an amplifier 242 which drives a relay or solid state switching device 244. Fed to relay 244 is a set point change signal varying from some plus value to some minus value. Twelve volts is shown in the example, but any value of voltage desired may be used. If the light gun is pointing at a particular variable in question, the amplifier 246 will be driven, and the relay will be closed, allowing the set point change device to drive the memory amplifier. The memory amplifier is used to store the last value of the set point requested by the operator. During the time the light gun 240 selects the particular memory amplifier 246 through the relay 244, the set point may be changed by moving the set point lever up or down. Moving the set point lever up or down changes the voltage input to the memory amplifier causing its output to either increase or decrease. In this way, a single set point change lever is required for all inputs to the system.

Figure 17:
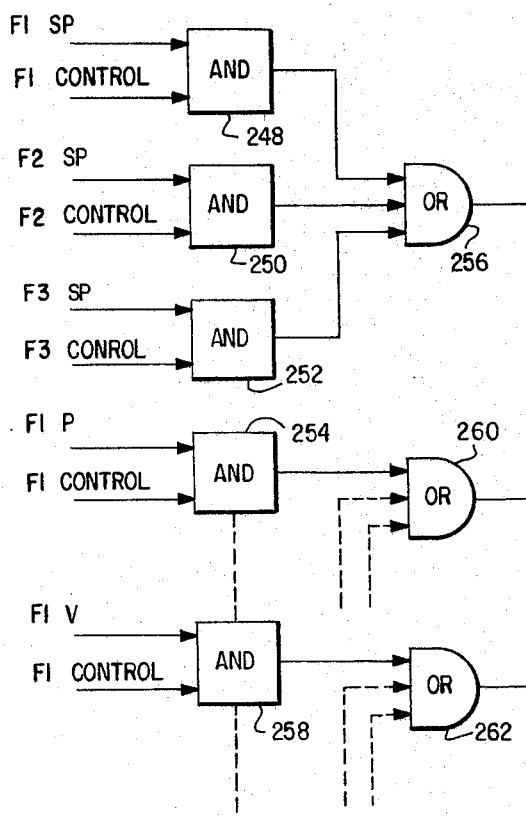
FIGURES 17 and 18 are logic block diagrams of an alternate digital display and selection control circuit.
Figure 16:
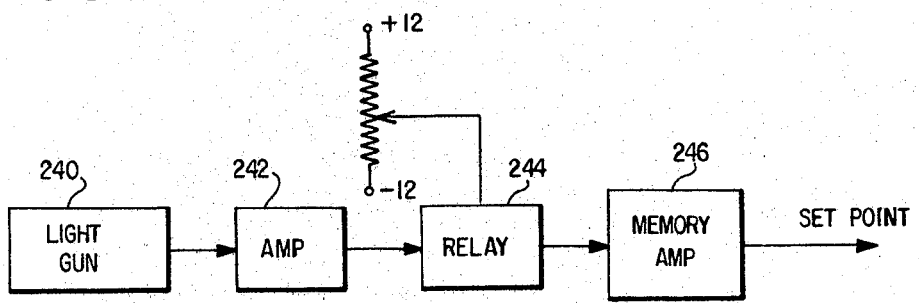
FIGURE 16 is a logic block diagram of an alternate set point memory.
Figure 18:
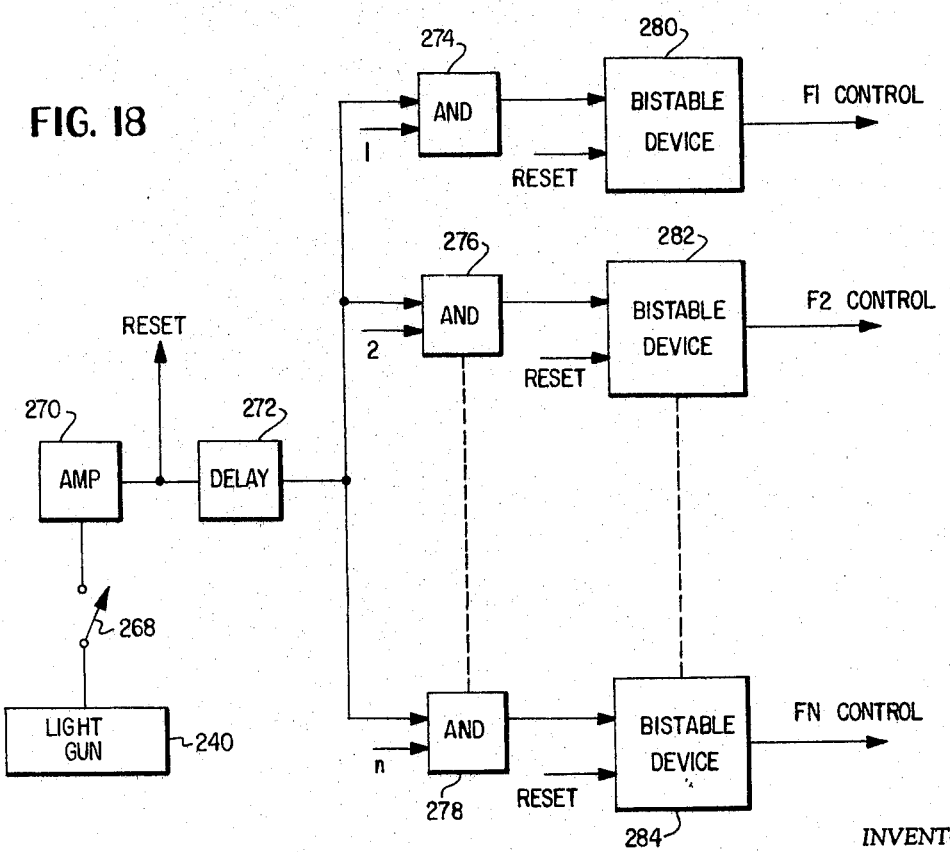

As explained above in connection with the description of the completely digital waveform generator, it may be desirable to digitally display the value of a particular variable. One system for performing that function was shown in FIGURE 8. Another method for selecting and digitally displaying the value of a selected variable is to connect all of the inputs of the system to a digital voltmeter. The readout may be performed by a multiple selection switch connected to each of the inputs, the switch being activated by the light gun in coincidence with the beam trace sweeping across the face of the light gun. At the time the latter two events occur, a memory device is locked, connecting the digital voltmeter to this input. One particular logic block diagram capable of performing the desired function in the manner described is shown in FIGURES 17 and 18. A single digital voltmeter 266 is connected to all of the inputs via a switch 264 and a group of AND gates and OR gates. An AND gate, such as AND gates 248, 250, 252, 254 and 258, is provided for each input. In FIGURE 17, the inputs are indicated by the process number and the type of variable. For example, F2-SP indicates the input lead corresponding to the set point variable of process F2. Three OR gates, 256, 260 and 262, are needed, one for each type of variable. To each AND gate is applied a control input, and the system is such that only one control input is present at any one time. For example, if it is desired to have a digital indication in the DVM 266 of variable P from process F1, the F1-control leads will be energized. Since the latter control leads are energized, F1-SP will pass through AND gate 248 and OR gate 256. F1-P will pass through AND gate 254 and OR gate 260. F1-V will pass through AND gate 258 and OR gate 262. Since the P variable is desired, switch 264 would be connected to the P terminal, thereby directly connecting DVM 266 to the output of OR gate 260.

The particular process to be digitally displayed by DVM 266 may be selected by means of the logic block circuitry shown in FIGURE 18. It can be seen that a bistable device, such as bistable devices 280, 282 and 284, is associated with each individual process. When SET, a bistable device provides a control signal to one of the AND gates of FIGURE 17. In operation, the operator places the face of light gun 240 on the oscilloscope intersecting the range line whose variable is to be digitally displayed, and digital display button 268 is depressed. When the electron beam sweeps across the face of the light gun 240, an output pulse passes through amplifier 270 and through delay 272 to AND gates 274 through 278. The output from amplifier 270 is also applied as reset inputs to all of the bistable devices for the purpose of removing the control signal which was previously present. The AND gates 274 through 278 also have inputs applied thereto from the selector pulse generator 202 which is shown in FIGURE 13. The coincidence of the electron beam sweeping across the face of the light gun and the particular output pulse from the selector pulse generator causes the proper bistable device to be SET, thereby providing the proper control signal to the AND gates in FIGURE 17.

What is claimed is:

1. A central display and control system for a plurality of process control units, said units being of the type wherein a process variable (P) is controlled either by applying a setpoint signal (SP) to a local controller circuitry which in turn applies a controlling voltage (V) to a controllable element or by applying an external controlling voltage (V) directly to said controlling element, wherein said central display and control system comprises
   (a) an electronic display screen of the movable spot type,
   (b) a memory unit for storing values therein, the number of values being equal to the number of processes being controlled by the display and control system,
   (c) means for connecting a stored value to the SP input of a corresponding process when said process is controlled by said local controller circuitry and
   (d) means responsive to voltages representing the SP, P, and V variables corresponding to the process control units for generating a visual pattern on the face of said electronic display indicating the relative values of said variables for each of said process control units.

2. The system as claimed in claim 1 further comprising means for electronically varying the stored value in said memory corresponding to any selected process control unit.

3. The system as claimed in claim 11 wherein said last named means comprises
   (a) a light gun responsive to the visual spot in said display sweeping across its face to generate an output pulse,
   (b) means responsive to the occurrence in time coincidence of an output pulse from said light gun and the generation on said display screen of a mark representing a particular process for applying a voltage varying input signal to said memory unit to change a stored value corresponding to said particular process, and (c) a first switch for connecting the light gun output to said means for applying.

4. The system as claimed in claim 3 further comprising
(a) means responsive to the time coincidence of a light gun output and the generation of a mark on the display corresponding to a particular process for displaying digitally one of the variables of said particular process, and
(b) a second switch for connecting the light gun output to said means for digitally displaying.

5. A central display for displaying process control information including setpoint, process variable and control element information, comprising
(a) an electronic display device having vertical and horizontal deflection electrodes and a brightness electrode,
(b) means for generating vertical lines on said display device, each representing a process control unit,
(c) means responsive to said setpoint information and connected to said vertical deflection electrodes for vertically positioning said vertical lines with respect to a horizontal level such that said horizontal level intersects the vertical lines at a distance from the bottom of said vertical lines proportional to the percent of full range which the setpoint is, and
(d) means responsive to said process variable information and connected to said horizontal deflection electrodes for generating a mark on said vertical lines whose distance from said horizontal level intersection represents the difference between the setpoint and the process variable for the process represented by the vertical line.

6. A central display as claimed in claim 5 further comprising
(a) means responsive to said control element information and connected to said brightness electrode for generating a mark on each vertical line positioned in accordance with the control element information corresponding to the process unit represented by the vertical line.

7. A central display as claimed in claim 5 further comprising
(a) a light gun responsive, when placed against the screen of said display device, to the sweep of the visual spot across the face thereof to produce an output pulse,
(b) a counter for accumulating a count representative of the process control unit being displayed,
(c) means responsive to a count in said counter representing a particular process control unit in time coincidence with a light gun output pulse for brightening the vertical line representing said particular process control unit.

8. The system as claimed in claim 7 further comprising switching means for connecting the light gun output to said means for brightening.

9. A central display as claimed in claim 6 further comprising
(a) a light gun responsive, when placed against the screen of said display device, to the sweep of the visual spot across the face thereof to produce an output pulse,
(b) a counter for accumulating a count representative of the process control unit being displayed,
(c) means responsive to a count in said counter representing a particular process control unit in time coincidence with a light gun output pulse for brightening the vertical line representing said particular process control unit.

10. The system as claimed in claim 9 further comprising switching means for connecting the light gun output to said means for brightening.

11. A display system for process control units of the type which compare setpoint information with process variable information in a controller which in turn controls a controllable element which varies the process variable, said system comprising
(a) an electronic display device of the type in which a visual spot is created and deflected across the face thereof, said electronic display having vertical and horizontal deflection electrodes and an intensity electrode,
(b) a counter, each count in said counter corresponding to a particular process control unit,
(c) a step wave generator responsive to each advance of said counter for providing a step wave voltage output,
(d) means for generating unblanking pulses, the duration of each unblanking pulses being slightly less than each step of said step wave, a single unblanking pulse being generated for each step of said step wave,
(e) means for applying the output from said unblanking pulse generator to the intensity electrode of said electronic display device,
(f) means for generating repetitively increasing voltage pulses which increase from a minimum value to a maximum value and rapidly decrease to said minimum value upon reaching said maximum value, each of said increasing voltage pulses being substantially coincident with said unblanking pulses,
(g) a first summation network having first and second inputs, and an output connected to said vertical deflection electrode of said electronic display device, said first input being connected to the output from said last mentioned means,
(h) means responsive to the setpoint (SP) information for generating D.C. level signals proportional to said setpoint information, said D.C. level signals being connected to the second input of said first summing network, and
(i) means connecting the output of said step wave generator to the horizontal deflection electrode of said electronic display device.

12. The system as claimed in claim 11 further comprising
(a) a plurality of storage elements containing setpoint information for the process control units respectively,
(b) means for applying said stored information to the respective control units,
(c) means for applying said stored information as the setpoint information to said means for generating D.C. level signals,
(d) storage element control means for varying the information stored in any of said storage elements when connected thereto,
(e) a light gun of the type capable of producing an output pulse in response to a light spot on a display screen being swept across the face thereof when the face is positioned against the display screen,
(f) means responsive to the coincidence of a light gun output pulse and the count in said counter for connecting said storage element control means to the storage element which stores information for a process control unit corresponding to the count in said counter, and
(g) first switching means for connecting the output of said light gun to said last mentioned means.

13. The system as claimed in claim 11 further comprising
(a) a digital readout display for digitally displaying selected information from a selected process,
(b) means responsive to the coincidence of a light gun output pulse and the count in said counter for selecting the process corresponding to the count in said counter, and
(c) second switching means for connecting the light gun output to said last mentioned means.

14. The system as claimed in claim 12 further comprising
(a) a digital readout display for digitally displaying selected information from a selected process,
(b) means responsive to the coincidence of a light gun output pulse and the count in said counter for selecting the process corresponding to the count in said counter, and
(c) second switching means for connecting the light gun output to said last mentioned means.

15. The system as claimed in claim 11 wherein said means connecting the output of said step wave generator to the horizontal deflection electrode comprises a second summation network having an output connected to said horizontal deflection electrode, and first and second inputs, the first input being connected to the output of said step wave generator, said system further comprising means responsive to the process variable information for generating spike pulses, one during each unblanking pulse, whose time of occurrence is determined by the values of said process variable information, the output from said last mentioned means being connected to the second input of said second summation network.

16. The system as claimed in claim 15 further comprising
(a) a plurality of storage elements containing setpoint information for the process control units respectively,
(b) means for applying said stored information to the respective process control units,
(c) means for applying said stored information as the setpoint information to said means for generating D.C. level signals,
(d) storage element control means for varying the information stored in any of said stoage elements when connected thereto,
(e) a light gun of the type capable of producing an output pulse in response to a light spot on a display screen being swept across the face thereof when the face is positioned against the display screen,
(f) means responsive to the coincidence of a light gun output pulse and the count in said counter for connecting said storage element control means to the storage element which stores information for a process control unit corresponding to the count in said counter, and
(g) first switching means for connecting the output of said light gun to said last mentioned means.

17. The system as claimed in claim 15 further comprising
(a) a digital readout display for digitally displaying selected information from a selected process,
(b) means responsive to the coincidence of a light gun output pulse and the count in said counter for selecting the process corresponding to the count in said counter, and
(c) second switching means for connecting the light gun output to said last mentioned means.

18. The system as claimed in claim 16 further comprising
(a) a digital readout display for digitally displaying selected information from a selected process,
(b) means responsive to the coincidence of a light gun output pulse and the count in said counter for selecting the process corresponding to the count in said counter, and
(c) second switching means for connecting the light gun output to said last mentioned means.

19. A display system for process control units of the type which compare setpoint information with process variable information in a controller which in turn controls a controllable element which varies the process variable, said system comprising
(a) an electronic display device of the type in which a visual spot is created and deflected across the face thereof, said electronic display having vertical and horizontal deflection electrodes and an intensity electrode,
(b) a counter, each count in said counter corresponding to a particular process control unit,
(c) a step wave generator responsive to each advance of said counter for providing a step wave voltage output,
(d) means for generating unblanking pulses, the duration of each unblanking pulse being slightly less than each step of said step wave, a single unblanking pulse being generated for each step of said step wave,
(e) a first summation network having at least first and second inputs, said first input being connected to the output of said unblanking pulse generator,
(f) means responsive to the controllable element (V) information from the process control units for generating spike pulses, one during each unblanking pulse, whose time of occurence is determined by the values of said controllable element information,
(g) means for connecting the output of said latter means to the second input of said first summation network,
(h) means connecting the output of said first summation network to the intensity electrode of said electronic display device,
(i) means for generating repetitively increasing voltage pulses which increase from a minimum value to a maximum value and rapidly decrease to said minimum value upon reaching said maximum value, each of said increasing voltage pulses being substantially coincident with said unblanking pulses,
(j) a second summation network having first and second inputs, and an output connected to said vertical deflection electrode of said electronic display device, said first input being connected to the output from said last mentioned means,
(k) means responsive to the setpoint (SP) information for generating D.C. level signals proportional to said setpoint information, said D.C. level signals being connected to the second input of said second summing network,
(l) a third summation network having first and second inputs and an output, said output connected to said horizontal deflection electrode and said first input being connected to the output of said step wave generator,
(m) means responsive to the process variable (P) information from the process control units for generating spike pulses, one during each unblanking pulse, whose time of occurrence is determined by the values of said process variable information, and
(n) means for connecting the output of said last mentioned means to the second input of said third summation network.

20. The system as claimed in claim 19 further comprising
(a) a plurality of storage elements containing setpoint information for the process control units respectively.
(b) means for applying said stored information to the respective process control units,
(c) means for applying said stored information as the setpoint information to said means for generating D.C. level signals,
(d) storage element control means for varying the information stored in any of said storage elements when connected thereto,
(e) a light gun of the type capable of producing an output pulse in response to a light spot on a display screen being swept across the face thereof when the face is positioned against the display screen,
(f) means responsive to the coincidence of a light gun output pulse and the count in said counter for connecting said storage element control means to the storage element which stores information for a process control unit corresponding to the count in said counter, and (g) first switching means for connecting the output of said light gun to said last mentioned means.

21. The system as claimed in claim 19 further comprising
(a) a digital readout display for digitally displaying selected information from a selected process,
(b) means responsive to the coincidence of a light gun output pulse and the count in said counter for selecting the process corresponding to the count in said counter, and
(c) second switching means for connecting the light gun output to said last mentioned means.

22. The system as claimed in claim 20 further comprising
(a) a digital readout display for digitally displaying selected information from a selected process,
(b) means responsive to the coincidence of a light gun output pulse and the count in said counter for selecting the process corresponding to the count in said counter, and
(c) second switching means for connecting the light gun output to said last mentioned means.

23. The system as claimed in claim 22 wherein said first and second switches comprise respectively first and second manually depressible buttons on the body of the light gun.

24. A central display and control system for displaying process control information from process control units of the type which either compare set point (SP) information with process variable (P) information and accordingly control a controllable element with control element (V) information or directly control said controllable element by externally supplied V information, said system comprising
(a) a first counter, each count in said counter corresponding to a process control unit,
(b) multiplexer means responsive to said counter and said information in the form of voltage proportional inputs for selecting the information relating to the process control unit to which the count in said counter corresponds,
(c) means for converting said selected information to digital signals, said digital signals representing the V, P, and SP information of the selected process control unit,
(d) a digital storage buffer,
(e) means for selecting one of said digital signals relating to one selected process control unit for storage in said storage buffer,
(f) digital readout means responsive to the information stored in said storage buffer for digitally reading out said stored information,
(g) an electronic display device of the type having vertical, horizontal and intensity controls, and
(h) means responsive to said selected information and connected to said controls for causing said display device to visually indicate the relative values of said selected information.

25. The system as claimed in claim 24 further comprising
(a) a plurality of bidirectional counters, the number of counters being equal to the number of processes controlled by said system,
(b) means for converting the digital values in said bidirectional counters into analog equivalents and for providing said analog equivalents as the SP inputs to said multiplexer,
(c) a light gun of the type which produces an output pulse when the head thereof is pressed against an electronic display screen and the visual spot of the electronic display is positioned on the screen where the head is pressed,
(d) means responsive to a light gun output pulse and the count in said first counter for varying the count in the bidirectional counter associated with the process control unit corresponding to the count in said first counter, and
(e) first switch means for connecting the light output pulse to said last mentioned means.

26. The system claimed in claim 25 further comprising
(a) a plurality of AND gates, one for each bidirectional counter,
(b) means responsive to the count in said first counter for energizing the corresponding AND gate,
(c) a first V gate adapted to receive said selected digital V information and responsive to a light gun output pulse for jamming said digital V information through the energized AND gate into the corresponding bidirectional counter,
(d) a second switching means for connecting said light gun output to said V gate, and
(e) means responsive to said second switching means for closing a circuit between said means for converting and the V input of the process unit corresponding to the count in said counter.

27. The system as claimed in claim 26 further comprising
(a) a first SP gate adapted to receive said selected digital SP information and responsive to a light gun output pulse for jamming said digital SP information through the energized AND gate into the corresponding bidirectional counter,
(b) a third switching means for connecting said light gun output to said SP gate and
(c) means responsive to said second switching means for closing a circuit between said means for converting and the SP input of the process unit corresponding to the count in said counter.

28. The system as claimed in claim 24 wherein said means for causing said display device to visually indicate the relative values of said selected information comprises
(a) a second counter for accumulating input pulses when enabled,
(b) a source of high frequency clock pulses connected to said second counter,
(c) means responsive to each advance of said first counter for generating a first pulse of predetermined duration,
(d) means responsive to said first pulse for enabling said second counter,
(e) a first digital-to-analog converter having an input connected to the output of said second counter and an output,
(f) a first summation network having two inputs and an output, the first input being connected to the output of said digital-to-analog converter and the output being connected to the vertical controls of the electronic display device,
(g) a second digital-to-analog converter having an input and an output,
(h) means for applying said selected SP digital information to the input of said second digital-to-analog converter,
(i) an inverter having an input and an output, said input being connected to the output of said second digital-to-analog converter and said output being connected to the second input of said first summation network.

29. The system as claimed in claim 28 wherein said means for causing said display device to visually indicate the relative values of said selected information further comprises,
(a) a first digital comparator for comparing the output from said second counter with the selected digital P signal and for providing an output when the two are equal, (b) means responsive to the output pulse from said first digital comparator for stopping the advance of said second counter for a predetermined period of time, (c) a third digital-to-analog converter having its input connected to the output from said first counter and (d) a second summation network for summing the outputs from said first digital comparator and said third digital-to-analog converter, and (e) means for connecting the output of said third summation network to the horizotnal controls of said electronic display device.

30. The system as claimed in claim 29 wherein said means for causing said display device to visually indicate the relative values of said selected information further comprises (a) a third summation network having at least first and second inputs and an output, (b) means for applying the output of said third summation network to the intensity control of said electronic display device, (c) means for applying said first pulse to the first input of said third summation netowrk, (d) a second digital comparator for comparing the output from said second counter with the selected digital V signal and for providing an output when the two are equal, and (e) means connecting the output from said second digital comparator to the second input of said third summation network.

31. A central display and control system for a plurality of process control units, said units being of the type wherein a process variable (P) is controlled either by applying a setpoint signal (SP) to a local controller circuitry which in turn applies a controlling voltage (V) to a controllable element or by applying an external controlling voltage (V) directly to said controlling element, wherein said central display and control system comprises (a) a color electronic display screen of the movable spot type, (b) a memory unit for storing values therein, the number of values being equal to the number of processes being controlled by the display and control system, (c) means for connecting a stored value to the SP input of a corresponding process when said process is controlled by said local controller circuitry and (d) means responsive to voltages representing the SP, P, and V variables corresponding to the process control units for generating a multi-colored visual pattern on the face of said electronic display indicating the relative values of said variables for each of said process control units, and (e) means responsive to the difference between the SP and P information of a given process being greater than a predetermined value for causing the display of said given process to be a color different from the display of processes whose SP and P differences are within the predetermined value.

32. A display and control system for process control units of the type which compare setpoint information with process variable information in a controller which in turn controls a controllable element which varies the process variable, said system comprising (a) a multi-color electronic display device of the type in which a visual spot is created and deflected across the face thereof, said electronic display having vertical and horizontal deflection electrodes and an intensity electrode, (b) a counter, each counter in said counter corresponding to a particular process control unit, (c) a step wave generator responsive to each advance of said counter for providing a step wave voltage output, (d) means for generating unblanking pulses, the duration of each unblanking pulse being slightly less than each step of said step wave, a single unblanking pulse being generated for each step of said step wave, (e) means for applying the output from said unblanking pulse generator to the intensity electrode of said electronic display device, (f) means for generating repetitively increasing voltage pulses which increase from a minimum value to a maximum value and rapidly decreasing to said minimum value upon reaching said maximum value, each of said increasing voltage pulses being substantially coincident with said unblanking pulses, (g) a first summation network having first and second inputs, and an output connected to said vertical deflection electrode of said electronic display device, said first input being connected to the output from said last mentioned means, (h) means responsive to the setpoint (SP) information for generating D.C. level signals proportional to said setpoint information, said D.C. level signals being connected to the second input of said first summing network, (i) means connecting the output of said step wave generator to the horizontal deflection electrode of said electronic display device, and (j) means for causing selected information on said display to appear in a different color than the remainder of said information.

33. A central display and control system for a plurality of process control units, said units being of the type wherein a process variable (P) is controlled by applying a setpoint signal (SP) to a local controller circuit which in turn applies a controlling voltage to a controllable element, wherein the central display and control system comprises:

(a) an electronic display screen of the movable spot type, (b) a memory unit for storing values therein, the number of values being equal to the number of processes being controlled by the display and control system, (c) means for connecting a stored value to the SP input of a corresponding process when said process is controlled by said local controller circuitry, and (d) means responsive to voltages representing the SP and P variables corresponding to the process control units for generating a visual pattern on the face of said electronic display indicating the relative values of said variables for each of said process control units.

References Cited

UNITED STATES PATENTS

| | | | |
|---|---|---|---|
| 3,337,860 | 8/1967 | O'Hara | 340—324 |
| 3,324,458 | 6/1967 | MacArthur | 340—324 |
| 3,348,032 | 10/1967 | Clardy et al. | 235—151.1 |
| 3,319,227 | 5/1967 | Evans | 340—324 |
| 2,611,811 | 9/1952 | Yates | 340—212 |
| 2,883,651 | 4/1959 | Akerlund | 340—413 |
| 3,189,889 | 6/1965 | Bridgett | 340—324.1 |
| 3,248,650 | 4/1966 | Bialkowski et al. | 340—212 |
| 3,345,625 | 10/1967 | Russell et al. | 340—212 |

JOHN W. CALDWELL, Primary Examiner

M. M. CURTIS, Assistant Examiner

U.S. Cl. X.R.

324—121; 340—151, 212

PO-1050
(5/69)

UNITED STATES PATENT OFFICE
CERTIFICATE OF CORRECTION

Patent No. 3,474,438            Dated October 21, 1969

Inventor(s) Verlin A. Lauher

It is certified that error appears in the above-identified patent and that said Letters Patent are hereby corrected as shown below:

In the Specification
Column 6, line 46      after seventy and between five insert a hyphen= - =

Column 13, line 10      after "proportional" change "by" to =to=

In the Claims:
Column 14, line 68      "claim 11" should be = claim 2 =
Column 16, line 17      "pulses" should be = pulse =
Column 22, line 14      "decreasing" should be = decrease =

SIGNED AND
SEALED
MAY 26 1970

(SEAL)
Attest:

Edward M. Fletcher, Jr.
Attesting Officer

WILLIAM E. SCHUYLER, JR.
Commissioner of Patents